United States Patent
Chen et al.

(10) Patent No.: US 8,667,515 B2
(45) Date of Patent: Mar. 4, 2014

(54) OPTICAL DISC DRIVER AND CASING STRUCTURE THEREOF

(75) Inventors: Yi-Chung Chen, Taipei (TW);
Wen-Chuang Yu, Taipei (TW);
Chih-Ching Yang, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 13/615,953

(22) Filed: Sep. 14, 2012

(65) Prior Publication Data

US 2013/0223002 A1 Aug. 29, 2013

(30) Foreign Application Priority Data

Feb. 29, 2012 (TW) .............................. 101203544 U

(51) Int. Cl.
*G11B 33/02* (2006.01)

(52) U.S. Cl.
USPC .......................................................... 720/646

(58) Field of Classification Search
USPC .......... 312/223.1, 223.2; 361/679.31–679.39; 720/600, 601, 646, 647, 652–657
See application file for complete search history.

(56) References Cited

U.S. PATENT DOCUMENTS

| | | | |
|---|---|---|---|
| 2004/0148614 A1* | 7/2004 | Bae ................................ | 720/601 |
| 2009/0328082 A1* | 12/2009 | Yoshida ......................... | 720/601 |
| 2010/0124007 A1* | 5/2010 | Yamamoto et al. ...... | 361/679.08 |
| 2012/0050982 A1* | 3/2012 | Lin et al. .................. | 361/679.33 |

* cited by examiner

*Primary Examiner* — Nathan Danielsen

(74) *Attorney, Agent, or Firm* — McClure, Qualey & Rodack, LLP

(57) ABSTRACT

A casing structure of an optical disc drive (ODD) includes an ODD case body and a panel part. The ODD case body includes a body and an embedded portion, where the embedded portion is located on the body and has a combination hole. The panel part includes a panel and a positioning portion, where the positioning portion is located on the panel and includes a positioning post and a limit part, the positioning post is disposed on the embedded portion and embedded in the combination hole, so that the panel is fixed to the body, and the panel and the limit part clamp the body. The panel masks a part of the body.

14 Claims, 10 Drawing Sheets

OPTICAL DISC DRIVER AND CASING STRUCTURE THEREOF

CROSS-REFERENCES TO RELATED APPLICATIONS

This non-provisional application claims priority under 35 U.S.C. §119(a) on Patent Application No. 101203544 filed in Taiwan, R.O.C. on Feb. 29, 2012 the entire contents of which are hereby incorporated by reference.

BACKGROUND

1. Technical Field

The disclosure relates to an optical disc drive (ODD), and in particular to an ODD and a casing thereof.

2. Related Art

Nowadays, various electronic devices such as a notebook computer, a desktop personal computer, and a digital versatile disc player are more and more popular. ODDs are built in most of the electronic devices. Even if the ODD is not built in the electronic device, the ODD may also be externally connected to the electronic device to read an optical disc.

In the traditional ODD, an upper cover and a lower cover are disposed outside a device body. In an assembly process, an assembler directly assembles the upper cover and the lower cover and then fixes the upper cover and the lower cover in a hot melting manner, so that the upper cover and the lower cover are firmly mounted on the device body.

However, when the upper cover and the lower cover are assembled in a hot melting fixing manner, after the assembly is completed, the upper cover and the lower cover cannot be disassembled and replaced and cannot be changed with appearances of different electronic devices, so that the ODD after assembly can only be mounted on machines of a predetermined kind, which is very inconvenient. Moreover, a hot melting process must be completed by relying on hot melting fixtures, which not only increases assembly complexity of the ODD, but also increases the production cost.

SUMMARY

In view of this, the embodiment of the present invention provides a casing structure of an ODD, including: an ODD case body and a panel part. The ODD case body includes a body and an embedded portion, where the embedded portion is located on the body and has a combination hole. The panel part includes a panel and a positioning portion, where the positioning portion is located on the panel and includes a positioning post and a limit part, the positioning post is disposed on the embedded portion and embedded in the combination hole, so that the panel is fixed to the body, and the panel and the limit part clamp the body. The panel masks a part of the body.

The embodiment of the present invention also provides an ODD, including: a device body, an ODD case body, and a panel part. The ODD case body is located on the device body, and includes a body and an embedded portion, where the embedded portion is located on the body and has a combination hole. The panel part includes a panel and a positioning portion, where the positioning portion is located on the panel and includes a positioning post and a limit part, the positioning post is disposed on the embedded portion and embedded in the combination hole, so that the panel is fixed to the body, and the panel and the limit part clamp the body. The panel masks a part of the body.

The efficacy of the embodiment of the present invention is that, the positioning portion and the embedded portion of simple structures are combined with the ODD case body and the panel part, making assembly and disassembly very simple and convenient, which not only improves the efficiency of assembling the casing, but also is convenient for subsequent maintenance operations performed by the maintenance personnel on the ODD, thereby effectively solving the problem in the prior art that the casing structure formed in a hot melting fixing manner can no longer be disassembled and replaced. Moreover, the panel part can match, according to different colors and shapes, electronic devices such as a desktop computer or a notebook computer where the ODD is mounted, so as to satisfy preferences of different customer groups.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1A:
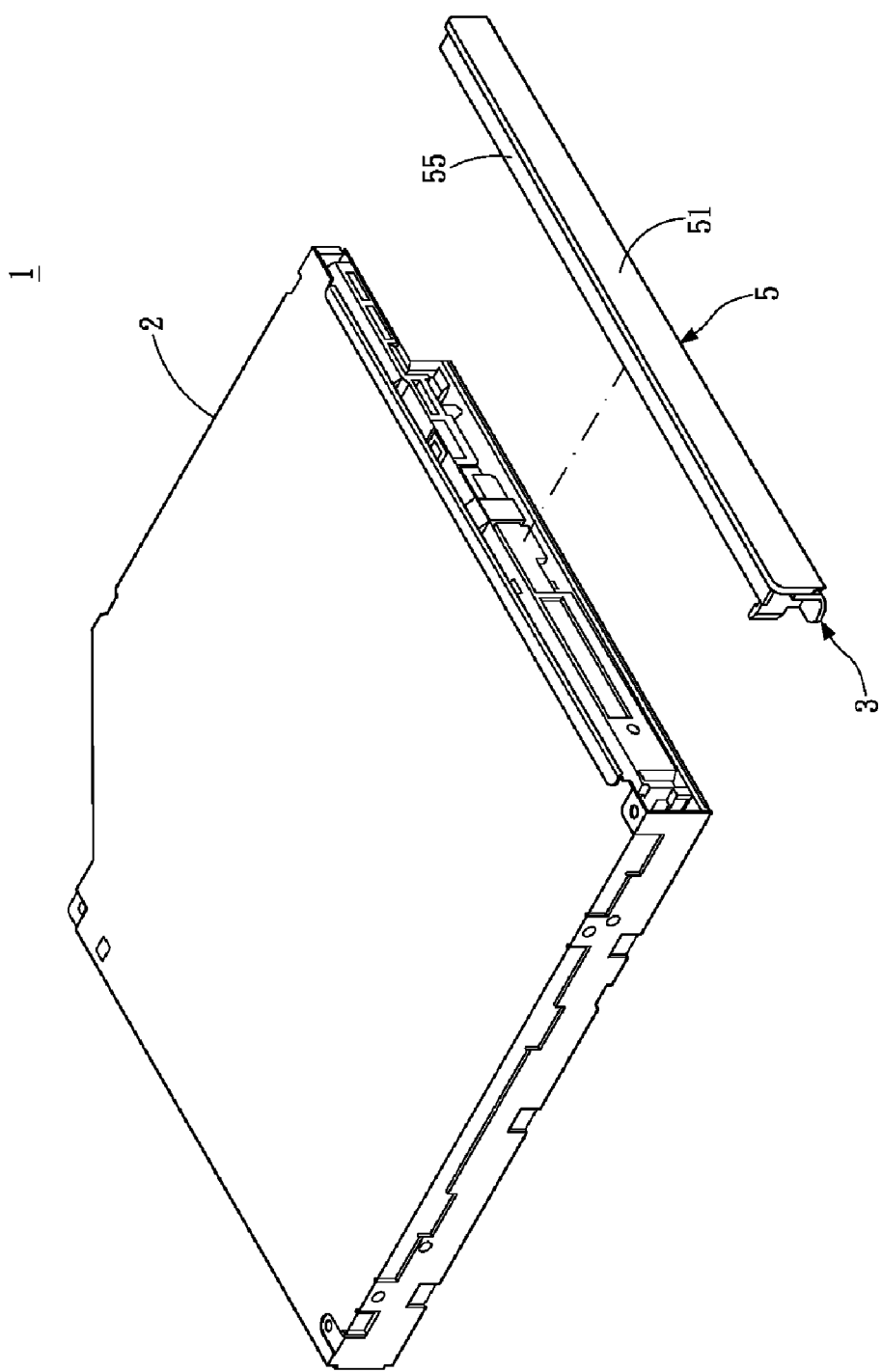
FIG. 1A is a schematic exploded outside view of an embodiment of the present invention.
Figure 1B:
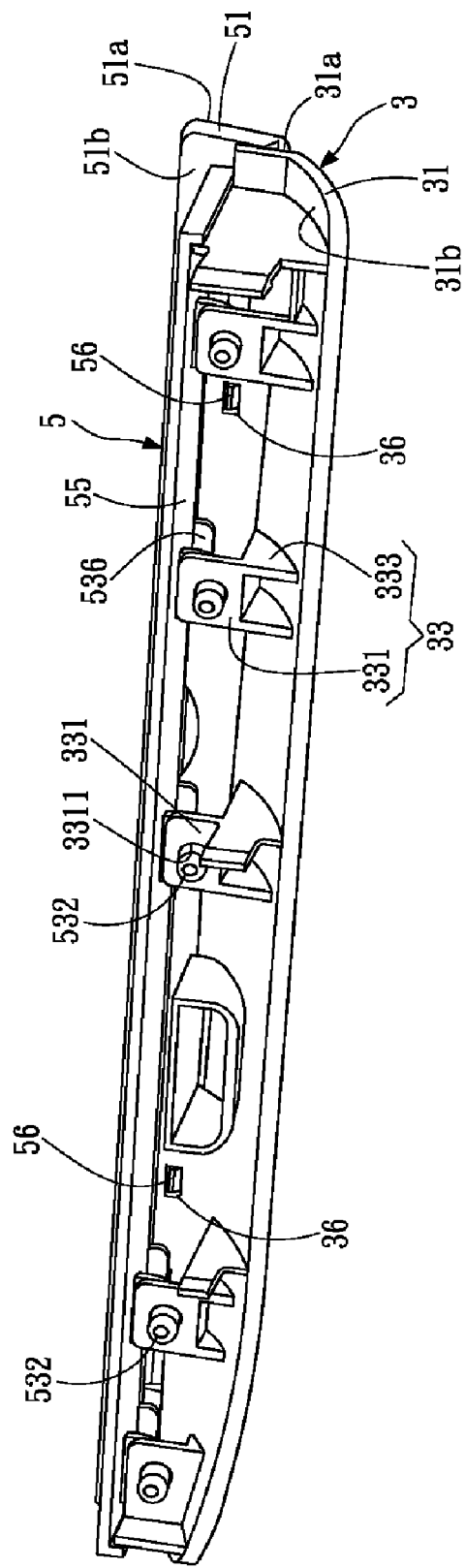
FIG. 1B is a schematic outside view of a casing structure of an embodiment of the present invention.
Figure 2:
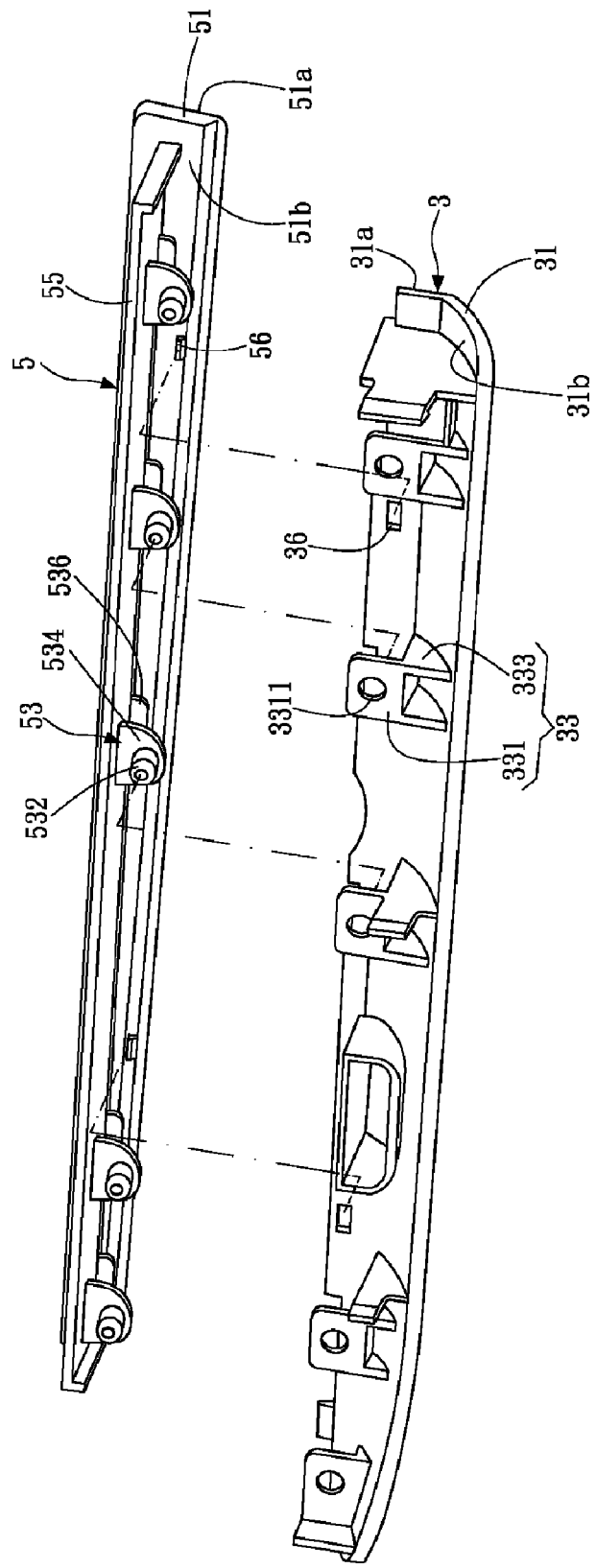
FIG. 2 is a schematic exploded view of a casing structure of an embodiment of the present invention.

Referring to FIG. 1A, FIG. 1B, and FIG. 2, FIG. 1A is a schematic exploded outside view of an embodiment of the present invention, FIG. 1B is a schematic outside view of a casing structure of an embodiment of the present invention, and FIG. 2 is a schematic exploded view of a casing structure of an embodiment of the present invention. That the casing structure disclosed in the present invention is applied to an ODD is taken as an example for description in this embodiment, but the present invention may also be applied to a casing structure of an electronic device of another suitable form. An ODD 1 of the present invention includes a device body 2, an ODD case body 3, and a panel part 5.

The device body 2 is formed by relevant electronic components, which depend on an application object and are not limited in the present invention. In this embodiment, the device body 2 has components such as a read/write head, a tray structure, and a popup structure.

The ODD case body 3 is disposed on the device body 2, and is mainly formed by a body 31 and an embedded portion 33, where the body 31 has a first surface 31a and a second surface 31b opposite each other and is somewhat bent towards the second surface 31b from the first surface 31a to form a sheet body with a cambered surface, and the embedded portion 33 is disposed on the second surface 31b of the body 31. In the figures of this embodiment, that the number of embedded portions 33 is five is taken as an example for description, but the present invention does not limit the number of embedded portions. Here, the embedded portion 33 may be mainly formed by a stop sheet 331 and a connection part 333, where one end of the connection part 333 is connected onto the second surface 31b of the body 31, the other end of the connection part 333 is connected to the stop sheet 331, and the stop sheet 331 has a combination hole 3311. Moreover, the connection part 333 may be formed by directly extending the body 31, and the stop sheet 331 is formed by directly extending the connection part 333.

The panel part 5 may be mainly formed by a panel 51 and a positioning portion 53, where the panel 51 has a first surface 51a and a second surface 51b. As a whole, the panel 51 is a rectangular plate body, and drawings (not shown) such as colors and patterns are coated on the first surface 51a. The positioning portion 53 is disposed on the second surface 51b of the panel 51. The number of the positioning portions 53 is the same as the number of the embedded portions 33. In other words, the positioning portion 53 is disposed corresponding to the embedded portion 33.

Figure 3:
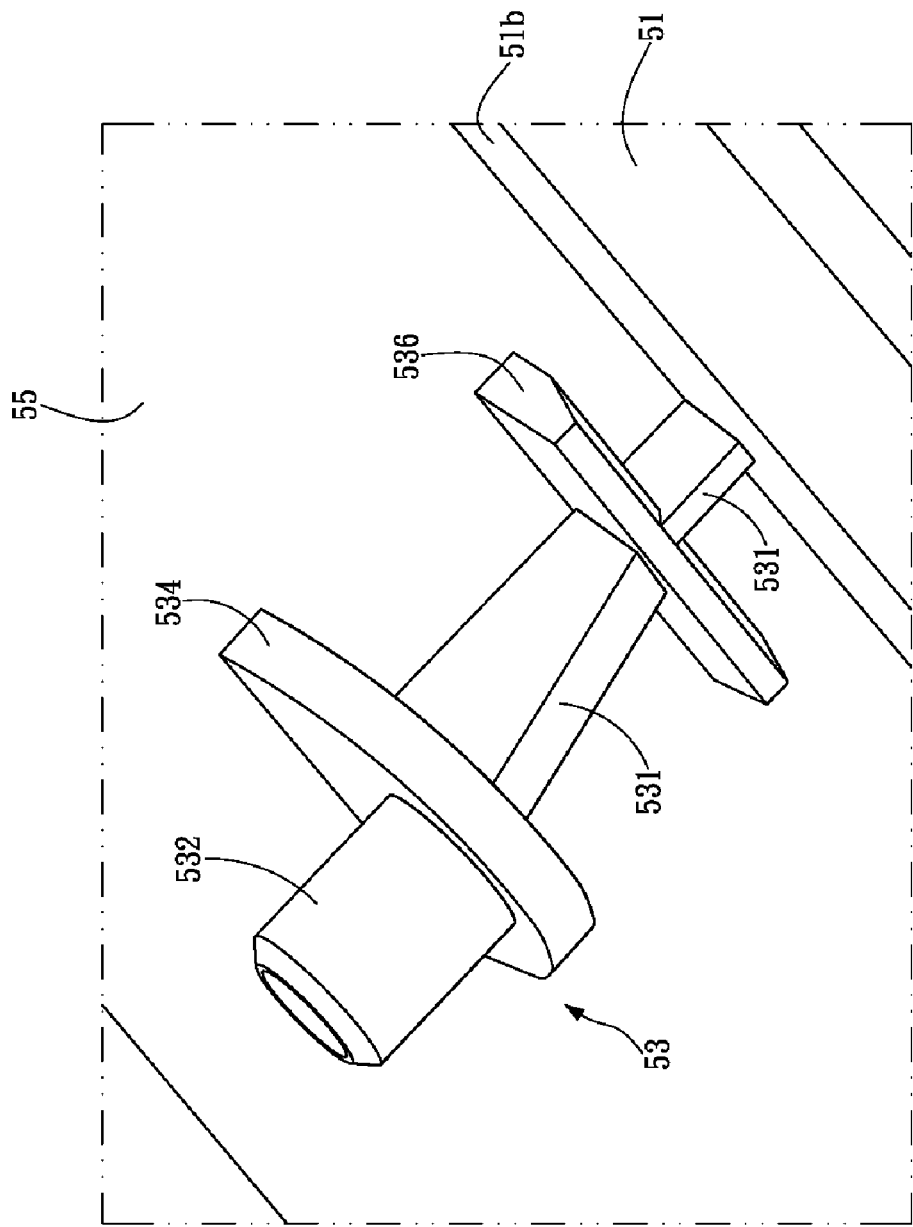
FIG. 3 is a schematic outside view of a positioning portion of an embodiment of the present invention.

Referring to FIG. 3, FIG. 3 is a schematic outside view of a positioning portion of an embodiment of the present invention. The positioning portion 53 may be mainly formed by a positioning body 531, a positioning post 532, a pressing sheet 534, and a limit part 536, where one end of the positioning body 531 is connected onto the second surface 51b of the panel 51, the other end of the positioning body 531 is connected to the positioning post 532, the pressing sheet 534 is disposed at a joint between the positioning body 531 and the positioning post 532, and the limit part 536 is disposed on the positioning body 531 and is near the second surface 51b of the panel 51 with an interval. Here, the pressing sheet 534 and the limit part 536 may be plate bodies of any shape, and the interval between the limit part 536 and the panel 51 is slightly greater than the thickness of the body 31 of the ODD case body 3, so that the body 31 of the ODD case body 3 can be embedded into the interval between the limit part 536 and the panel 51.

Figure 4:
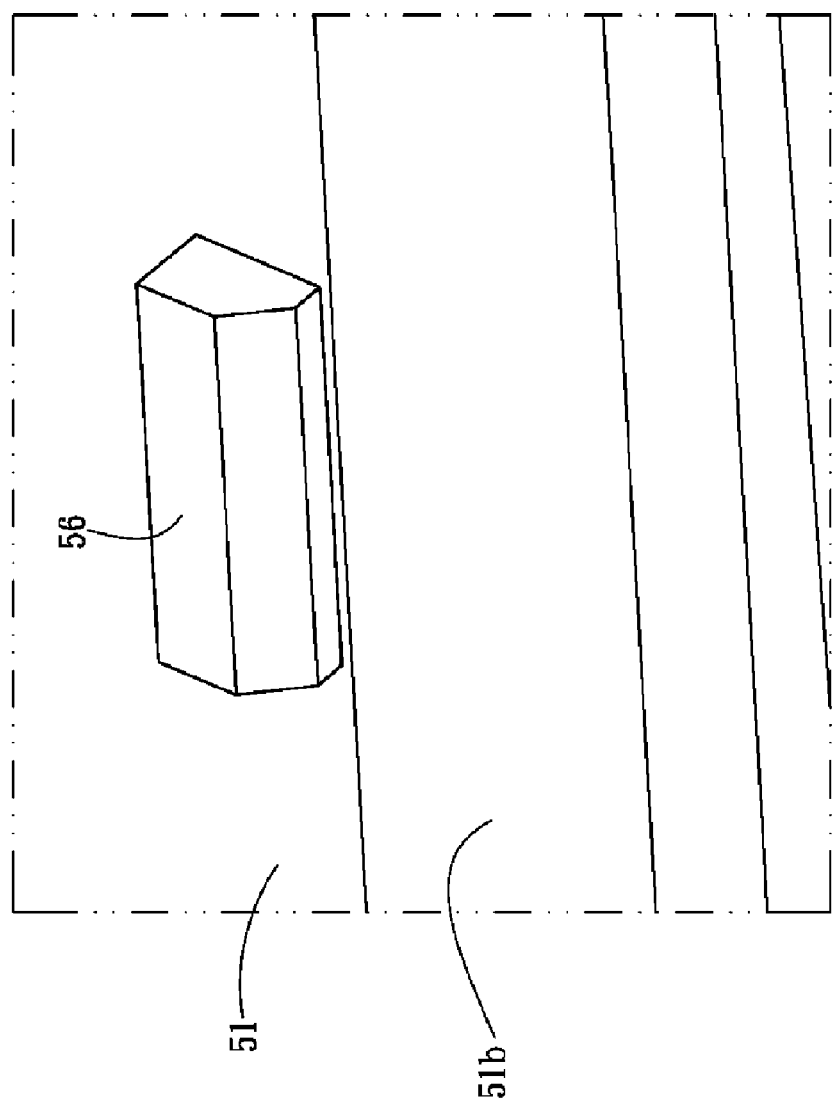
FIG. 4 is a schematic partial view of a casing structure of an embodiment of the present invention after assembly.
Figure 5:
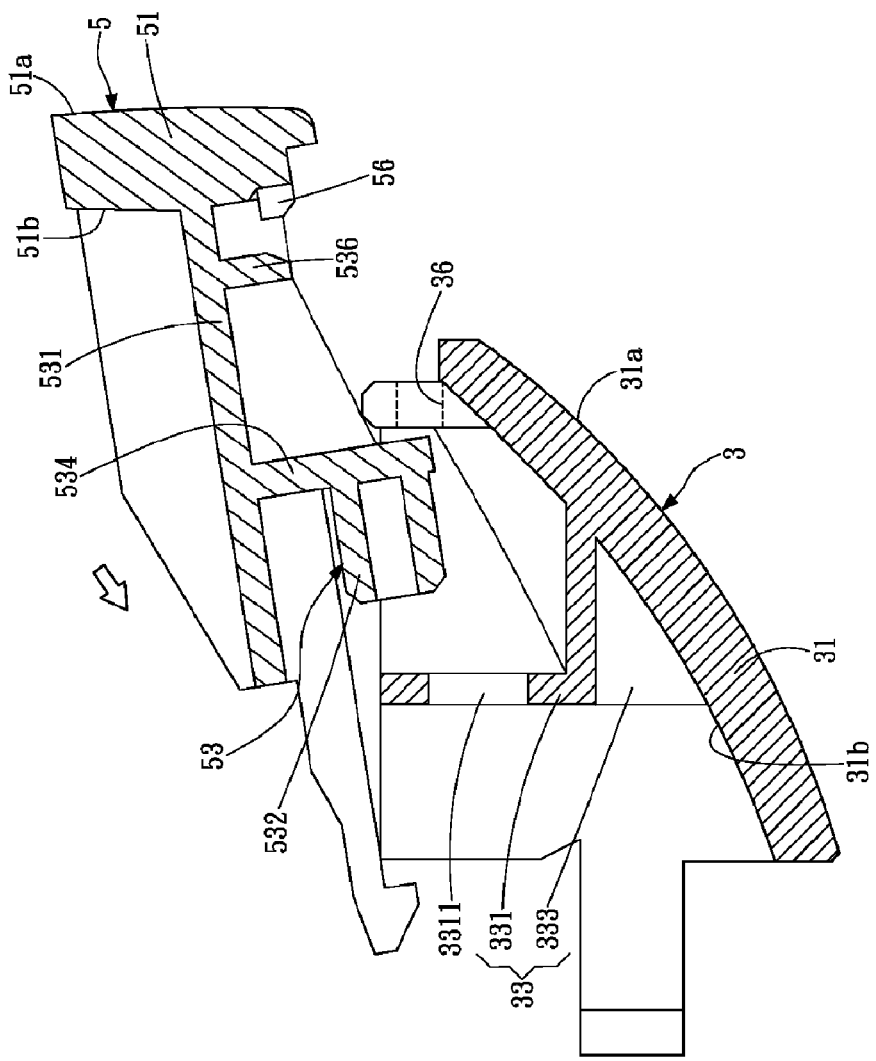
FIG. 5 is a first schematic view of assembly of an embodiment of the present invention.
Figure 6:
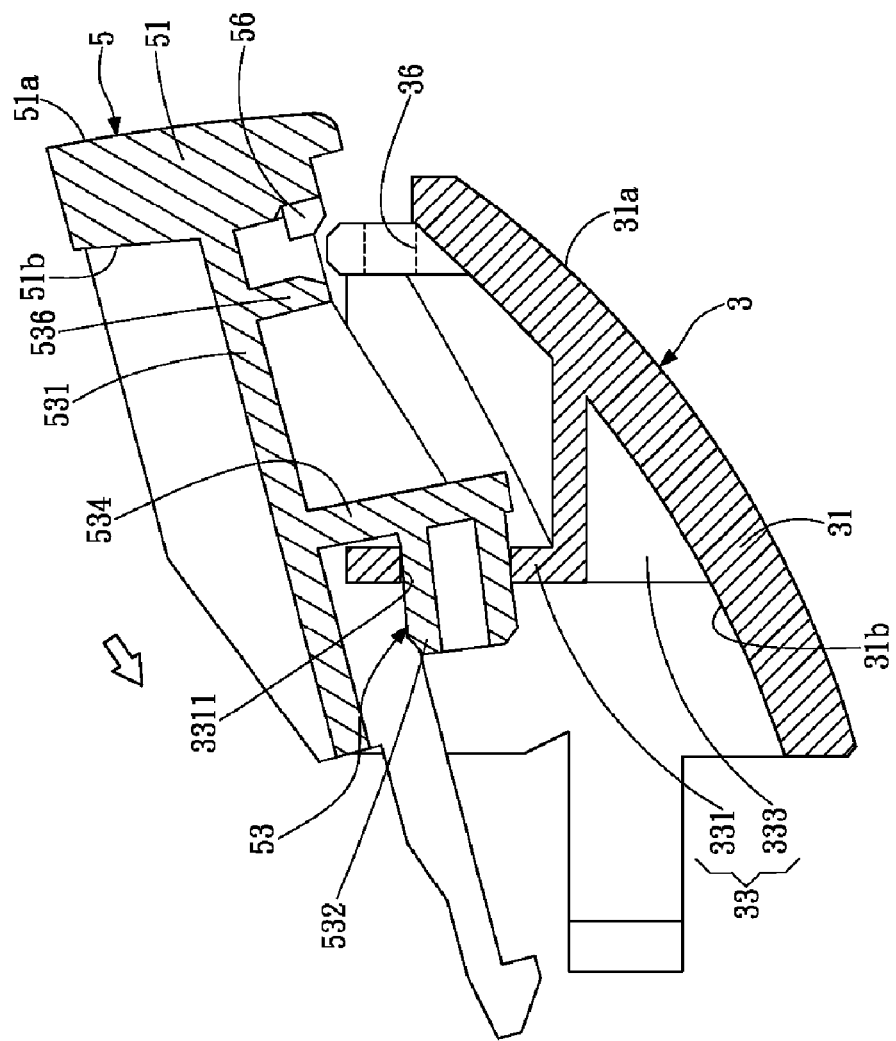
FIG. 6 is a second schematic view of assembly of an embodiment of the present invention.

Referring to FIG. 2, in this embodiment, the panel part 5 may be further provided with an extension sheet 55, connected to the second surface 51b of the panel 51 and formed by extending the second surface 51b of the panel 51 towards an axial direction of the positioning post 532. Referring to FIG. 2 and FIG. 4, the body 31 of the ODD case body 3 is provided with a fastening hole 36, and the panel part 5 is provided with a trip part 56 on the second surface 51b of the panel 51, where the trip part 56 is disposed corresponding to the fastening hole 36 and can be fastened in the fastening hole 36.

Referring to FIG. 5 to FIG. 8, FIG. 5 to FIG. 8 are schematic views of assembly of an embodiment of the present invention. During assembly, a user places the panel part 5 over the ODD case body 3, and places the panel part 5 into the ODD case body 3 at an inclination angle, so that the positioning post 532 is embedded in the combination hole 3311 of the stop sheet 331. When the pressing sheet 534 presses against the stop sheet 331, the positioning post 532 of the panel part 5 cannot be continuously advanced. In this case, the user pushes the panel part 5 down, so that the body 31 of the ODD case body 3 is embedded in the interval between the limit part 536 and the panel 51. In the process that the user pushes the panel part 5 down, the trip part 56 is displaced along the first surface 31a of the body 31 until the trip part 56 is fastened in the fastening hole 36 and the limit part 536 and the panel 51 clamp the body 31, so as to combine the ODD case body 3 with the panel part 5; moreover, the panel 51 masks a part of the body 31 and exposes the first surface 51a of the panel 51, and the extension sheet 55 covers the body 31.

Figure 7:
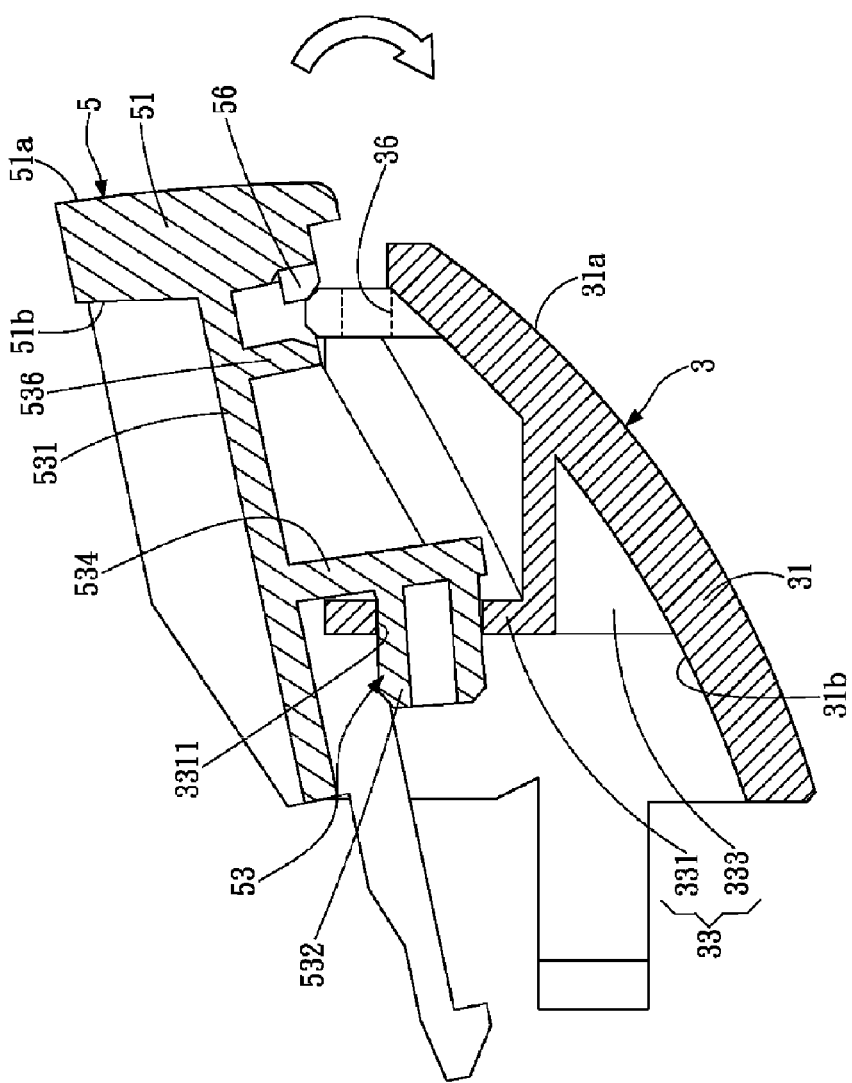
FIG. 7 is a third schematic view of assembly of an embodiment of the present invention.
Figure 8:
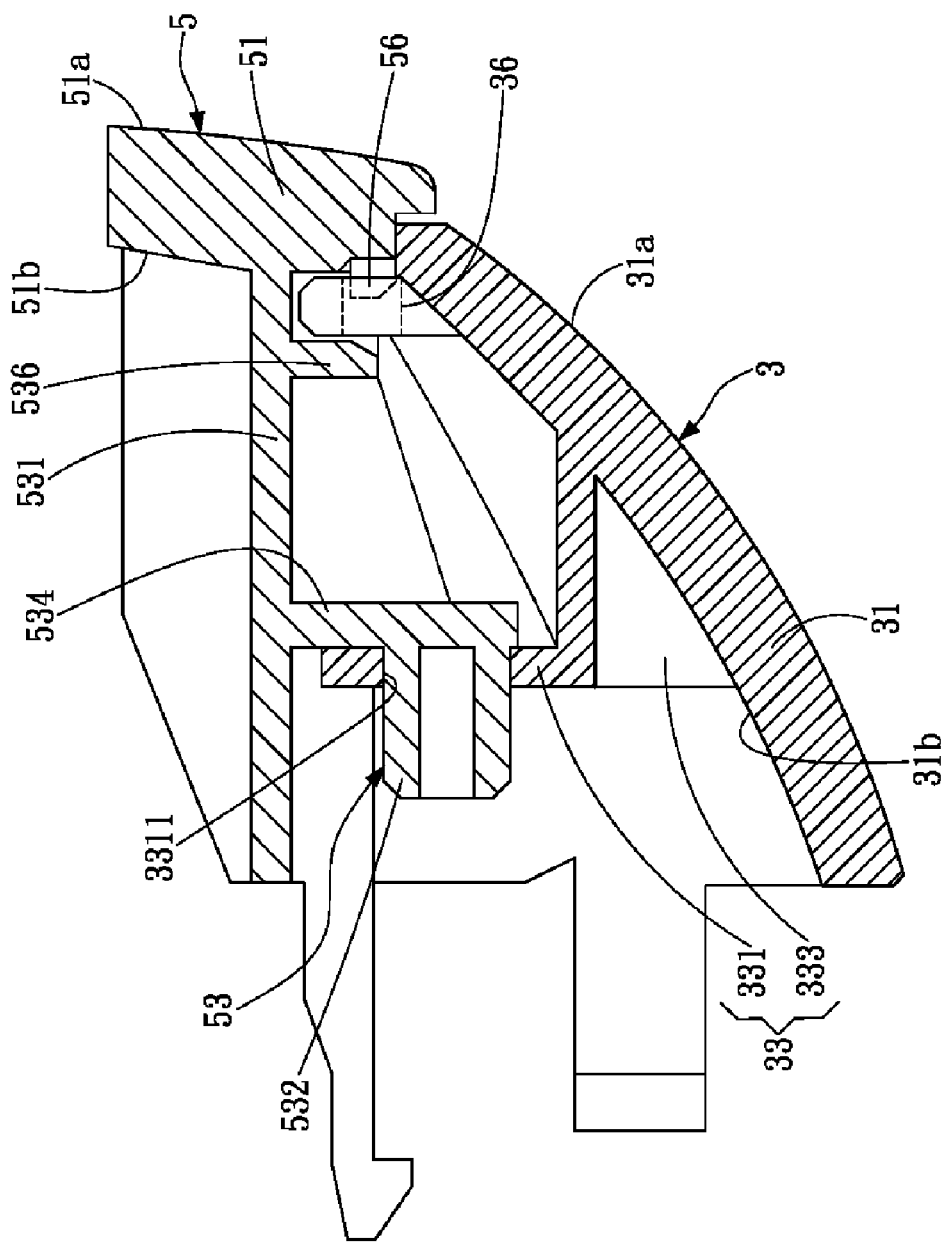
FIG. 8 is a fourth schematic view of assembly of an embodiment of the present invention.
Figure 9:
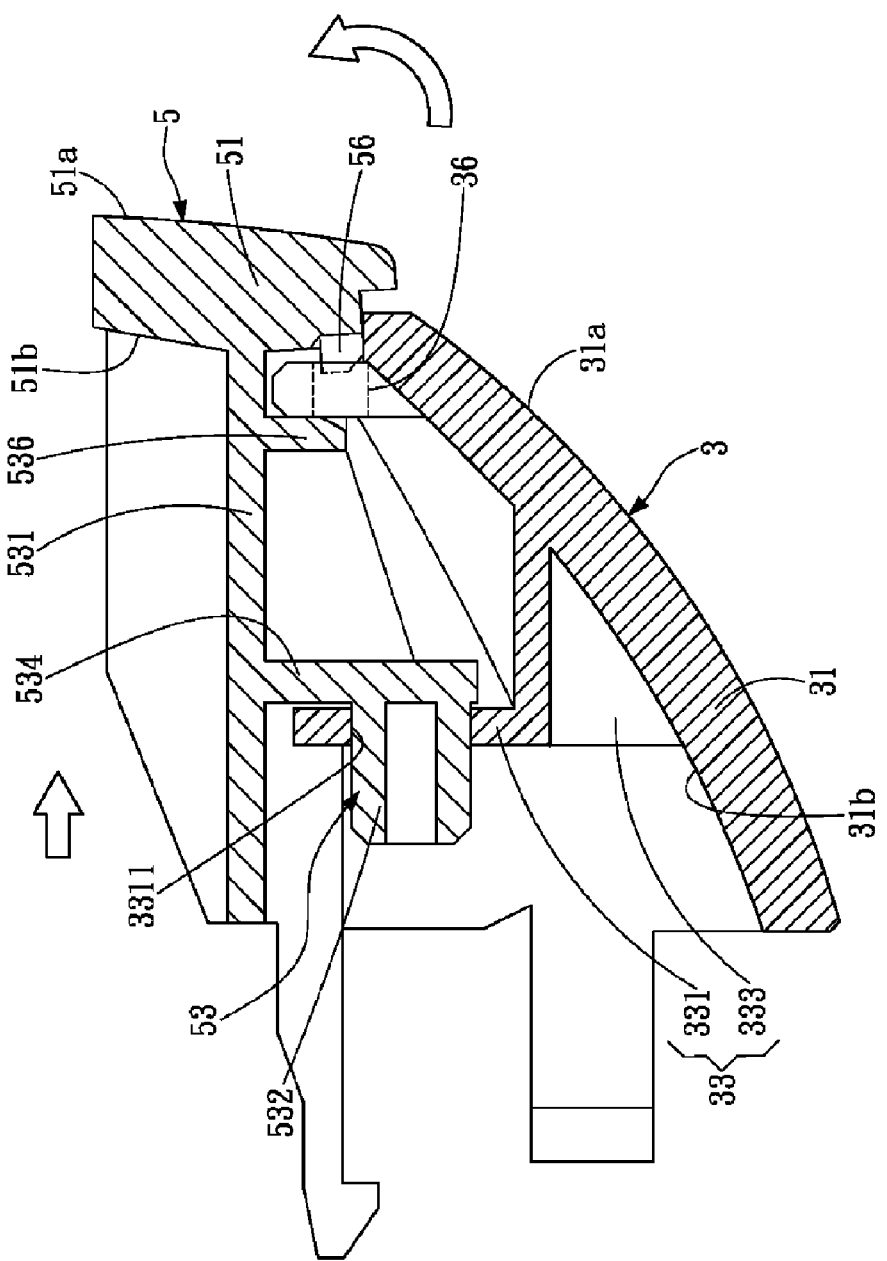
FIG. 9 is a schematic view of disassembling a panel part of an embodiment of the present invention.

Referring to FIG. 9, FIG. 9 is a schematic view of disassembling a panel part of an embodiment of the present invention. When a user intends to disassemble the panel part 5 or replace the panel part 5 with a panel part with drawings of different colors and patterns, the user applies a force to a bottom end of the panel 51 of the panel part 5, to pull out the panel 51 in a direction from the second surface 51b towards the first surface 51a, so that the trip part 56 is separated from the fastening hole 36. Then, the panel 51 is pulled up, so that the trip part 56 and the limit part 536 leave the body 31 (the location state is shown in FIG. 7). In this case, the user can continuously pull out the panel 51 in a direction from the second surface 51b towards the first surface 51a, so that the positioning post 532 is separated from the combination hole 3311 of the stop sheet 331, so as to complete the disassembling of the panel part 5.

It can be known from the foregoing description that, in the ODD and the casing thereof provided by the present invention, the positioning portion and the embedded portion of simple structures are combined with the ODD case body and the panel part, making assembly and disassembly very simple and convenient, which not only improves the efficiency of assembling the casing, but also is convenient for subsequent maintenance operations performed by the maintenance personnel on the ODD, thereby effectively solving the problem in the prior art that the casing structure formed in a hot melting fixing manner can no longer be disassembled and replaced. Moreover, the panel part can match, according to different colors and shapes, electronic devices such as a desktop computer or a notebook computer where the ODD is mounted, so as to satisfy preferences of different customer groups. Furthermore, the present invention does not need to perform the hot melting fixing operation, so compared with the prior art, the present invention can save hot melting fixtures and effectively reduce the production cost.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A casing structure of an optical disc drive (ODD), comprising:
   an ODD case body, comprising a body portion and an embedded portion, wherein the embedded portion is located on the body portion and has a combination hole; and
   a panel part, comprising a panel and a positioning portion, wherein the positioning portion is located on the panel and comprises a positioning post and a limit part, the positioning post is disposed on the embedded portion and embedded in the combination hole, so that the panel is fixed to the body portion, and the panel and the limit part clamp the body portion; and the panel masks a part of the body portion.

2. The casing structure of an ODD according to claim 1, wherein the body portion comprises a fastening hole, the panel comprises a trip part, and the trip part is fastened in the fastening hole and fixed to the body portion.

3. The casing structure of an ODD according to claim 1, wherein the positioning portion further comprises a positioning body connected to the panel, the limit part is located at an end of the positioning body close to the panel, and the positioning post is located at an end of the positioning body far away from the panel.

4. The casing structure of an ODD according to claim 3, wherein the positioning portion further comprises a pressing sheet, located between the positioning post and the positioning body.

5. The casing structure of an ODD according to claim 4, wherein the embedded portion further comprises a stop sheet, the combination hole is located on the stop sheet, and when the positioning post is embedded in the combination hole, the pressing sheet presses against the stop sheet.

6. The casing structure of an ODD according to claim 5, wherein the embedded portion further comprises a connection part, one end of the connection part is connected to the body, and the other end of the connection part is connected to the stop sheet.

7. The casing structure of an ODD according to claim 1, wherein the panel part comprises an extension sheet, formed by extending the panel towards an axial direction of the positioning post.

8. An optical disc drive (ODD), comprising:
a device body;
an ODD case body, located on the device body and comprising a body portion and an embedded portion, wherein the embedded portion is located on the body portion and has a combination hole; and
a panel part, comprising a panel and a positioning portion, wherein the positioning portion is located on the panel and comprises a positioning post and a limit part, the positioning post is disposed on the embedded portion and embedded in the combination hole, so that the panel is fixed to the body portion, and the panel and the limit part clamp the body portion; and the panel masks a part of the body portion.

9. The ODD according to claim 8, wherein the body portion comprises a fastening hole, the panel comprises a trip part, and the trip part is fastened in the fastening hole and fixed to the body portion.

10. The ODD according to claim 8, wherein the positioning portion further comprises a positioning body connected to the panel, the limit part is located at an end of the positioning body close to the panel, and the positioning post is located at an end of the positioning body far away from the panel.

11. The ODD according to claim 10, wherein the positioning portion further comprises a pressing sheet, located between the positioning post and the positioning body.

12. The ODD according to claim 11, wherein the embedded portion further comprises a stop sheet, the combination hole is located on the stop sheet, and when the positioning post is embedded in the combination hole, the pressing sheet presses against the stop sheet.

13. The ODD according to claim 12, wherein the embedded portion further comprises a connection part, one end of the connection part is connected to the body, and the other end of the connection part is connected to the stop sheet.

14. The ODD according to claim 8, wherein the panel part comprises an extension sheet, formed by extending the panel towards an axial direction of the positioning post.

* * * * *